United States Patent [19]

Pass

[11] 4,167,664

[45] Sep. 11, 1979

[54] ADJUSTABLE READ HEAD ASSEMBLY

[75] Inventor: Raymond V. Pass, Camp Hill, Pa.

[73] Assignee: AMP Incorporated, Harrisburg, Pa.

[21] Appl. No.: 871,070

[22] Filed: Jan. 20, 1978

[51] Int. Cl.² .................... G06K 7/08; G11B 5/56; G11B 21/24

[52] U.S. Cl. .................................... 235/449; 360/109

[58] Field of Search ................ 235/449, 450; 360/104, 360/109

[56] References Cited

U.S. PATENT DOCUMENTS

| 3,413,627 | 11/1968 | Sender | 360/104 |
| 3,836,753 | 9/1974 | Pass | 235/449 |
| 3,890,644 | 6/1975 | Goetzinger et al. | 360/101 |
| 3,940,796 | 2/1976 | Haun et al. | 360/109 |
| 3,978,522 | 8/1976 | Rothlisberger et al. | 360/104 |

*Primary Examiner*—Daryl W. Cook
*Attorney, Agent, or Firm*—Russell J. Egan

[57] ABSTRACT

An improved assembly is disclosed for adjustably mounting a read-write head in a card reader apparatus so as to compensate for warped and inaccurate cards without yielding erroneous data. The subject assembly includes a head carrying frame member, an intermediate frame member, and a pivot block assembly, all of which combine to provide an adjustable floating action of the magnetic head carried thereby with respect to cards passed thereunder.

6 Claims, 7 Drawing Figures

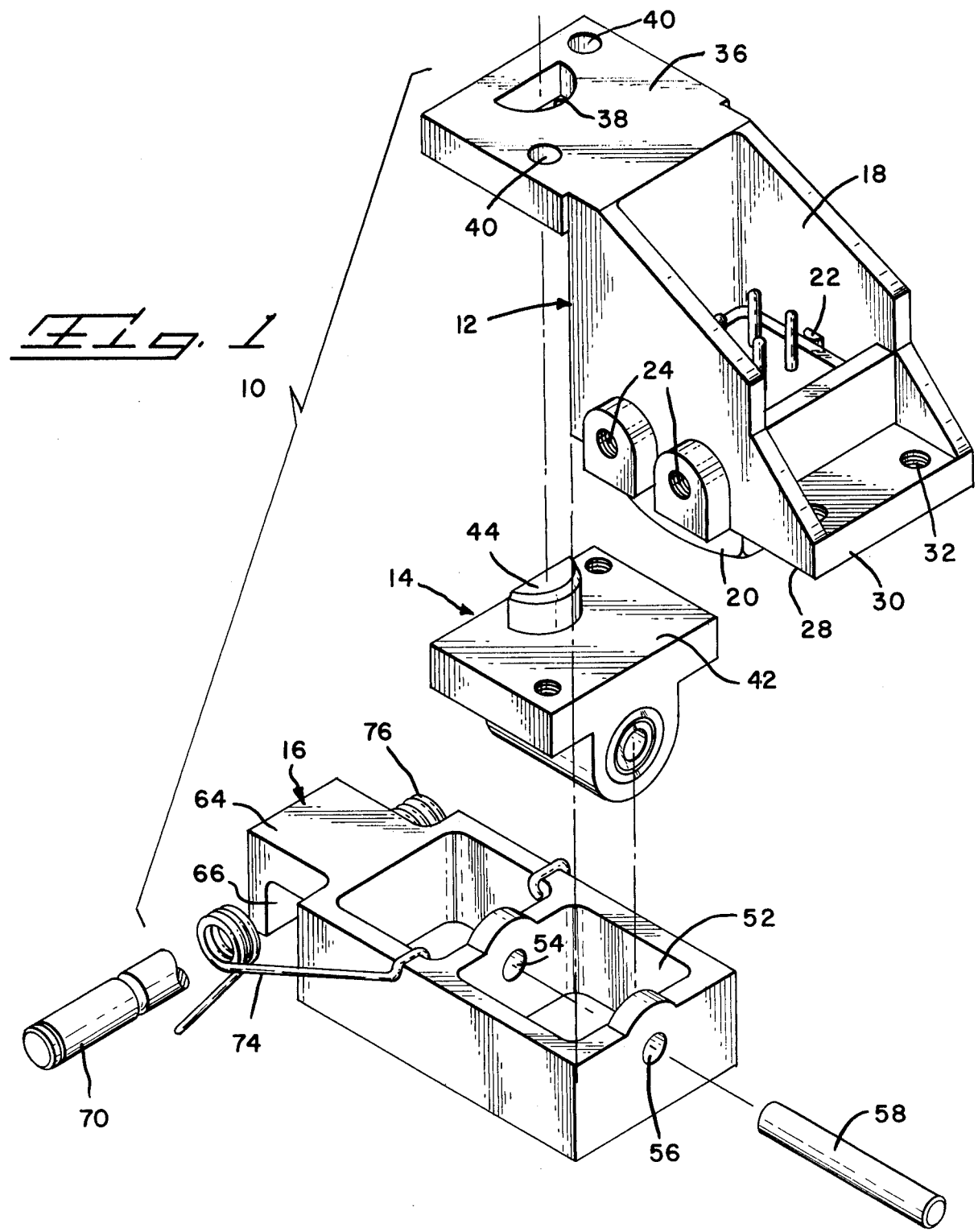

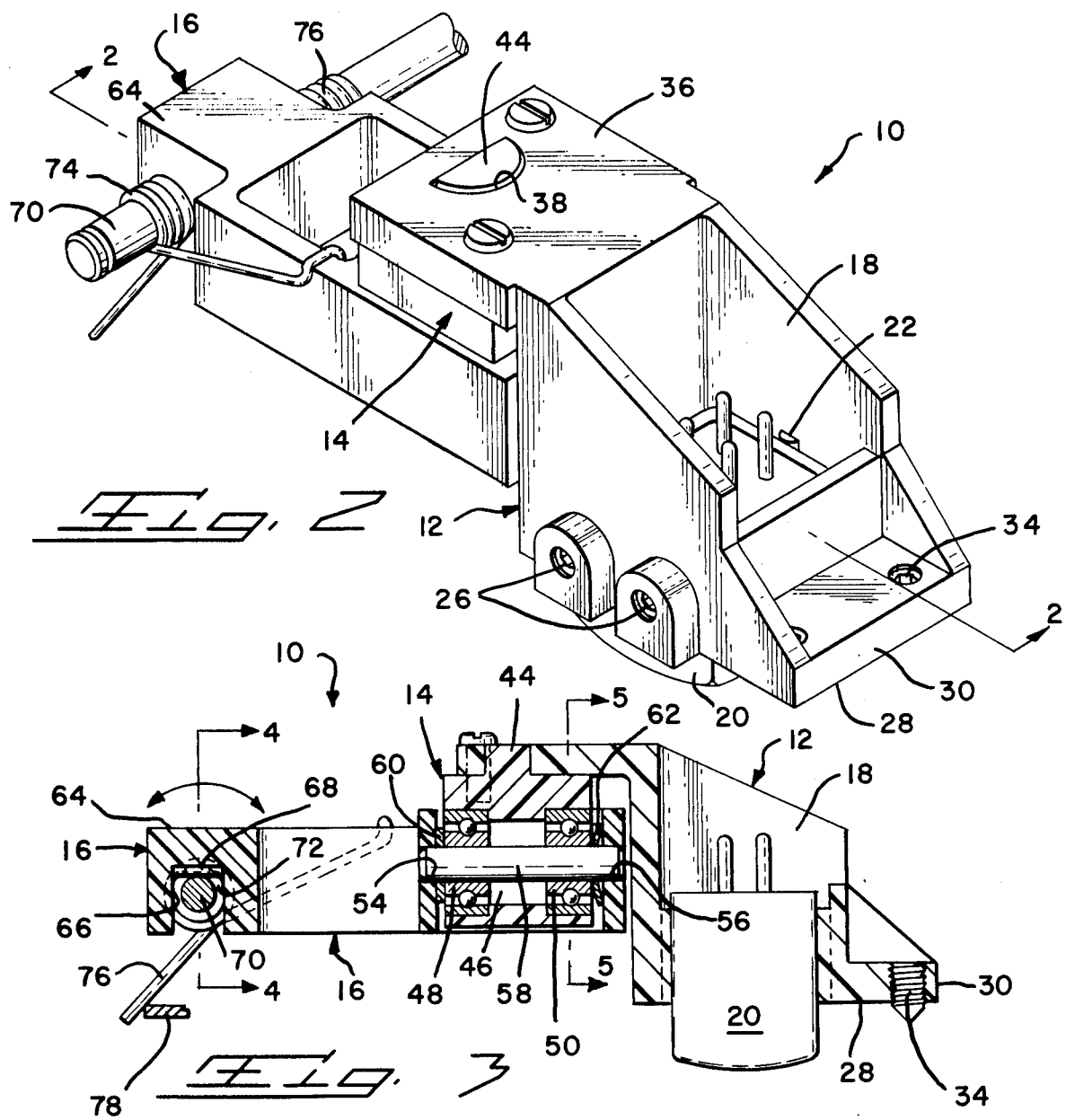
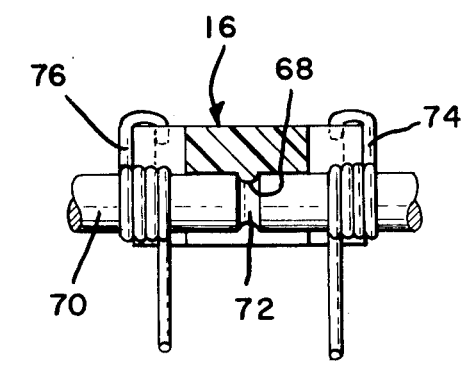
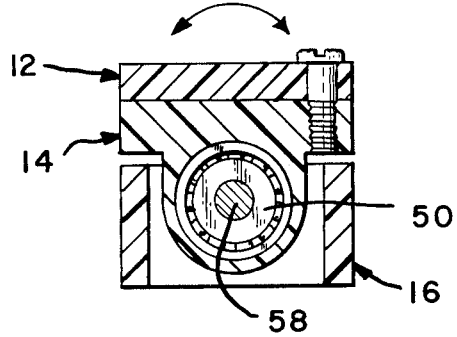

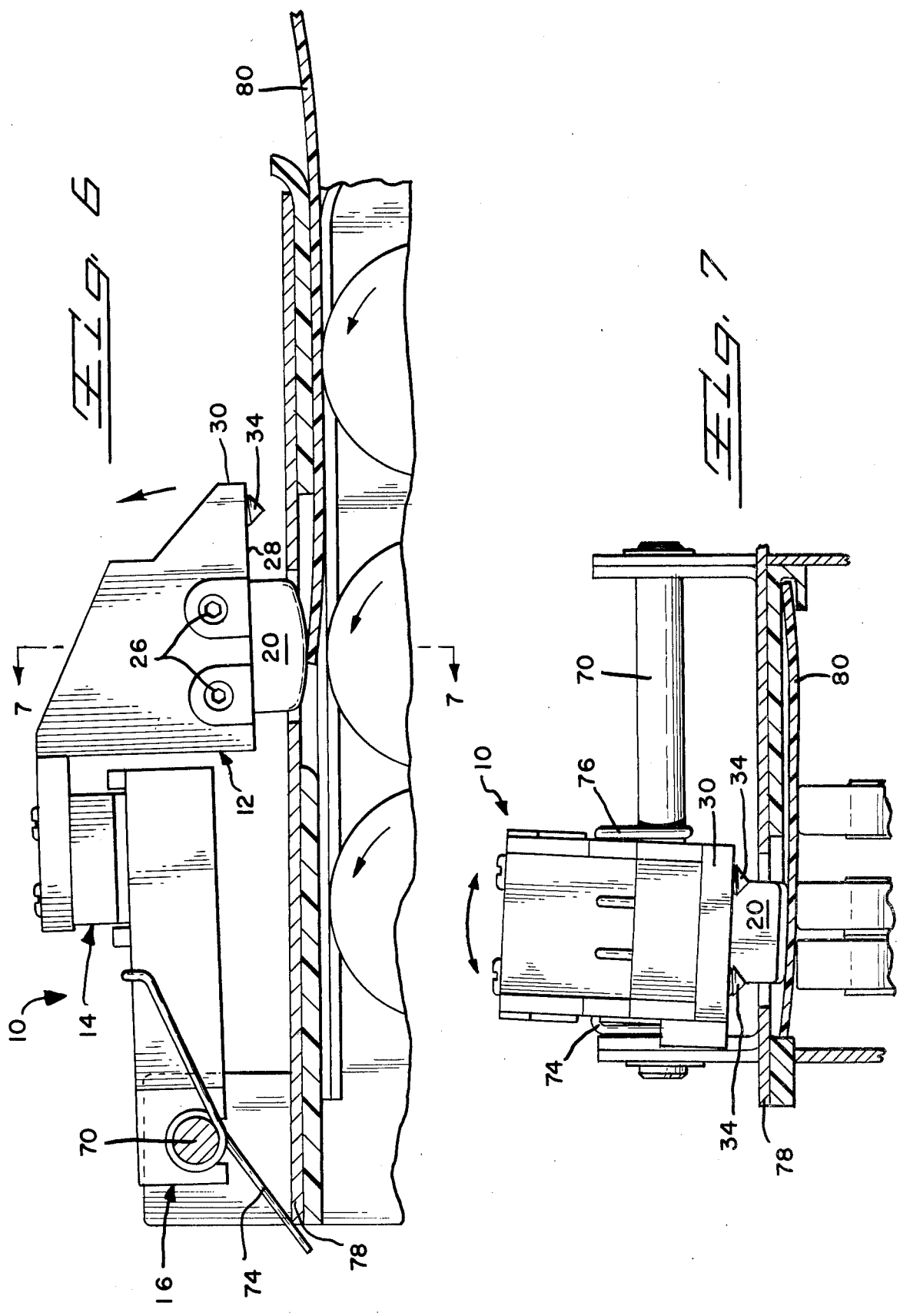

ADJUSTABLE READ HEAD ASSEMBLY

BACKGROUND OF THE INVENTION

1. The Field of the Invention

The present invention relates to an improved mounting assembly for a magnetic head of a card reader and in particular to an adjustable assembly providing float of the read-write head to compensate for card irregularities.

2. The Prior Art

The present invention relates to an improvement in the mounting of magnetic read-write heads in magnetic card readers of the type such as that disclosed in my U.S. Pat. No. 3,836,753, the disclosure of which is incorporated herein by reference to include the operational portions of a magnetic card reader that are not in point to the present invention. Other known prior art is represented by U.S. Pat. Nos. 3,890,644 and 3,940,796 which include apparatus for mounting a card reader head so as to compensate for irregularities in the surface of the card to be acted upon.

SUMMARY OF THE INVENTION

The present invention concerns an improved assembly for mounting a read-write head in a card reader or the like and includes a head frame member with a read-write head adjustably mounted therein, an intermediate block member having the head frame member adjustably secured thereto, a mounting frame having the intermediate block pivotally mounted thereon about a first axis and in turn being mounted about a pivot pin extending normal to the first pivot pin. Spring means are included to bias the mounting frame so that the read-write head is held against the card to be acted upon.

It is therefore an object of the present invention to produce an improved assembly for mounting a read-write head in a card reader or the like so that the head will have a floating action to compensate for irregularities in the card being acted upon.

It is a further object of the present invention to produce an adjustable assembly for mounting a read-write head in a card reader or the like so as to provide tolerances to accommodate for card warpage.

It is a further object of the present invention to produce a read-write head mounting assembly which may be readily and economically produced.

The foregoing objects and other advantages of the present invention will be apparent to those skilled in the art from the following detailed description taken with reference to the accompanying drawings.

BRIEF DESCRIPTION OF THE DRAWINGS

FIG. 1 is an exploded perspective view of the subject read-write head mounting assembly;

FIG. 2 is a perspective view, similar to FIG. 1, showing the complete assembly of the present invention;

FIG. 3 is a longitudinal vertical section taken along line 3—3 of FIG. 2;

FIG. 4 is a transverse vertical section taken along line 4—4 of FIG. 3;

FIG. 5 is a transverse vertical section taken along line 5—5 of FIG. 3;

FIG. 6 is a side elevation, partially in section, showing the subject read-write head mounting assembly in a known card reader; and FIG. 7 is a transverse view, partially in section, taken along lines 7—7 of FIG. 6.

DETAILED DESCRIPTION OF THE PREFERRED EMBODIMENT

The subject read-write head mounting assembly 10 includes a head frame member 12, an intermediate block 14, and a mounting frame 16. This assembly is mounted in a known card reader type device and provides an improved mounting of the head to accommodate irregularities in the cards being read thereby.

The head frame member 12 has an elongated profile and includes a central aperture 18 which receives a read-write head 20 therein. The aperture includes an inwardly directed alignment projection 22 substantially centrally located on each wall defining the aperture. In one wall of the aperture are a pair of parallel, spaced, threaded bores 24 which receive screws 26 therein. The screws 26 are directed normal to the wall and lie on opposite sides of the respective projection. The screws 26 bear against the read-write head 20 and, in cooperation with projections 22, angularly position the read-write head with respect to the head frame member as well as secure the head with a specified amount projecting from the under surface 28 of the head frame member 12. The forward portion of the head frame member includes a step-like adjustment projection 30 having a pair of parallel, spaced, threaded bores 32 therein. The bores each receive therein a conically pointed threaded screw 34, which is used for parallel alignment adjustment to be described later positioned to bear against portion 78 of the frame. The head frame member 12 also includes a rearwardly directed mounting flange 36 having a profiled aperture 38 therein and a pair of spaced, threaded bores 40.

The intermediate member 14 has an upper mounting surface 42 having a profiled stud 44 extending therefrom and receivable in the profiled aperture 38 of the head frame member. The intermediate block 14 also includes a passage 46 having bearings 48, 50 mounted in the opposite ends thereof.

The mounting frame member 16 has an elongated profile which includes an aperture 52 at one end in which the intermediate block is mounted. Bores 54, 56 are aligned in opposite walls of the frame defining the aperture 52 and receive therein a pivot pin 58 passing through inner races of bearings 48, 50. A spacer 60 is mounted on the pin 58 between a wall of the aperture 52 including bore 54 and the inner race of bearing 48 to provide the necessary clearance between the frame and the block to prevent rubbing contact between the members 14 and 16. A curved spring washer or bellville spring 62 is mounted on the opposite end of the pivot pin 58 between the wall containing bore 56 and the intermediate block member 14. This pre-load curved spring washer presses against the inner race of the bearing 50 to provide a positive bias force through the bearings to eliminate all internal clearances normally associated with bearings of this construction. This preloading is necessary to eliminate any random fore and aft motion of the read-write head, which would add to card travel motion and possibly cause erroneous results. The rear of the mounting frame member 16 has a hooked extension 64 defining a channel 66 having a curved projection 68 extending therein. The assembly is mounted on a pivot pin 70 having at least one annular groove 72 therein in which the projection 68 engages to accurately accommodate and laterally locate the subject assembly 10 within the reading device. Spring members 74, 76 are mounted on the pivot pin 70 and bear by one end against a portion 78 of the frame and on the other end against the mounting frame member 16 to bias the assembly into an operative condition.

The subject assembly allows for adjustment of the read-write head for azimuth (skew), tilt (face lift off) and pitch. Defining these terms further, azimuth is the angular variations between the read-write head gap center line and the recorded flux lines. Tilt is the angular variations between the face of the read-write head and the surface of the magnetic stripe causing seperation of the read-write head pole from the magnetic stripe. Pitch is the angular variation from a true perpendicular condition of the read-write head.

The pitch angle variation is the least critical of the three and is controlled by the height location of the read-write head within the head frame member.

The azimuth, also referred to as skew angle, is a very important setting and is controlled by the two cone point set screws 26 in the read-write head mounting frame 12. Because of the importance of this setting, it is usually done in the factory where measurement equipment is available.

The tilt angle is self-compensating with this assembly which offers a floating arrangement so that minor tilt angle variations can be tolerated. However, the initial approach of the card to the read head is important, thus the assembly must be adjusted to provide optimum clearance between the read head face and the back rollers. This is set by adjusting the two set screws 34 at the front of the assembly to bear against a portion 78 of the frame. The set screws 34 are shown in FIGS. 6 and 7.

In addition to the altitude control of the read-write head assembly, the forces applied to keep the read-write head in intimate contact with the magnetic stripe are important. The force is applied by the two torsion springs 74, 76. Any unbalance between the two springs will cause one side of the head to wear faster than the other and may also show up as a non-uniform output on either track. If non-uniform output is detected on either track it may be necessary to increase the force of the associated torsion spring.

The track of the assembly can be adjusted by appropriate mating of projection 68 in an annular recess 72 of the mounting pin 70.

It will be appreciated from FIGS. 6 and 7 that the subject mounting assembly allows both a lifting and rocking movement of the read-write head to accommodate for curvature in the card 80.

The present invention may be subject to many modifications and changes without departing from the spirit or essential characteristics thereof. The present embodiment is therefore to be considered in all respects as illustrative and not restrictive of the scope of the invention.

What is claimed is:

1. An assembly for mounting a read-write head in a card reader and the like so as to accommodate for card irregularities without introducing erroneous data, said assembly comprising:
   an elongated head carrying frame member having a central portion defining a read-write head receiving aperture, a mounting flange extending in a first direction from said central portion and an adjustment flange extending in the opposite direction from said central portion, means for mounting a read-write head in said aperture, a profiled aperture in said mounting flange and adjustment means in said adjustment flange;
   an intermediate member having a mounting surface with a like profiled stud extending therefrom and received in said profiled aperture of said head carrying frame member, means to secure said mounting flange to said mounting surface, an axial passage, bearing means mounted in opposite ends of said passage; and
   an elongated mounting frame member defining on one end thereof an aperture for receiving said intermediate member therein and a hooked extension on the opposite end, a pair of aligned bores in opposite walls of said aperture, pivot pin means the ends of which are received in said bores in said mounting frame member and passing through said bearings to rotatably mount said intermediate member in said mounting frame member for movement about a first axis, and a hooked extension on the opposite end of said mounting frame members, said hooked extension engaging a mounting pin for rotational movement about an axis extending normal to said first axis, whereby said read-write head is mounted to float so as to accommodate irregularities in a card being read.

2. An assembly according to claim 1 wherein said adjustment means comprises:
   a pair of parallel spaced screw means rotatably mounted in said adjustment flange and having conical ends adjustably bearing against a surface.

3. An assembly according to claim 1 further comprising:
   a spacer member on one end of said pivot pin between said mounting frame member and an inner race of the adjacent bearing; and
   a preload spring washer on the other end of said pivot pin between said frame member and an inner race of the adjacent bearing whereby random fore and aft movement of said intermediate member along said pivot pin is eliminated while rotational movement about said pivot pin is unhindered.

4. An assembly according to claim 1 further comprising:
   spring means mounted on said mounting pin and acting on said assembly to bias it against a card reading surface.

5. An assembly according to claim 1 wherein said mounting pin includes at least one annular groove;
   further comprising at least one curved projection in said hooked extension engaging a respective groove in said mounting pin whereby said assembly is accurately located on said mounting pin.

6. An assembly according to claim 1 wherein said means for mounting said read-write head further comprise:
   an inwardly directed projection substantially centrally located on each wall defining said read-write head receiving aperture, and
   a pair of screw members in one said wall in parallel spaced relation on opposite sides of the respective projection, said screw members adjustably bearing against said read-write head whereby the extension of said head from the assembly and its parallism with said assembly are adjusted.

* * * * *